Dec. 18, 1956    C. E. WALLER    2,774,642
ADJUSTABLE TABLE FOR MILLING MACHINES
Filed March 21, 1955    4 Sheets-Sheet 2

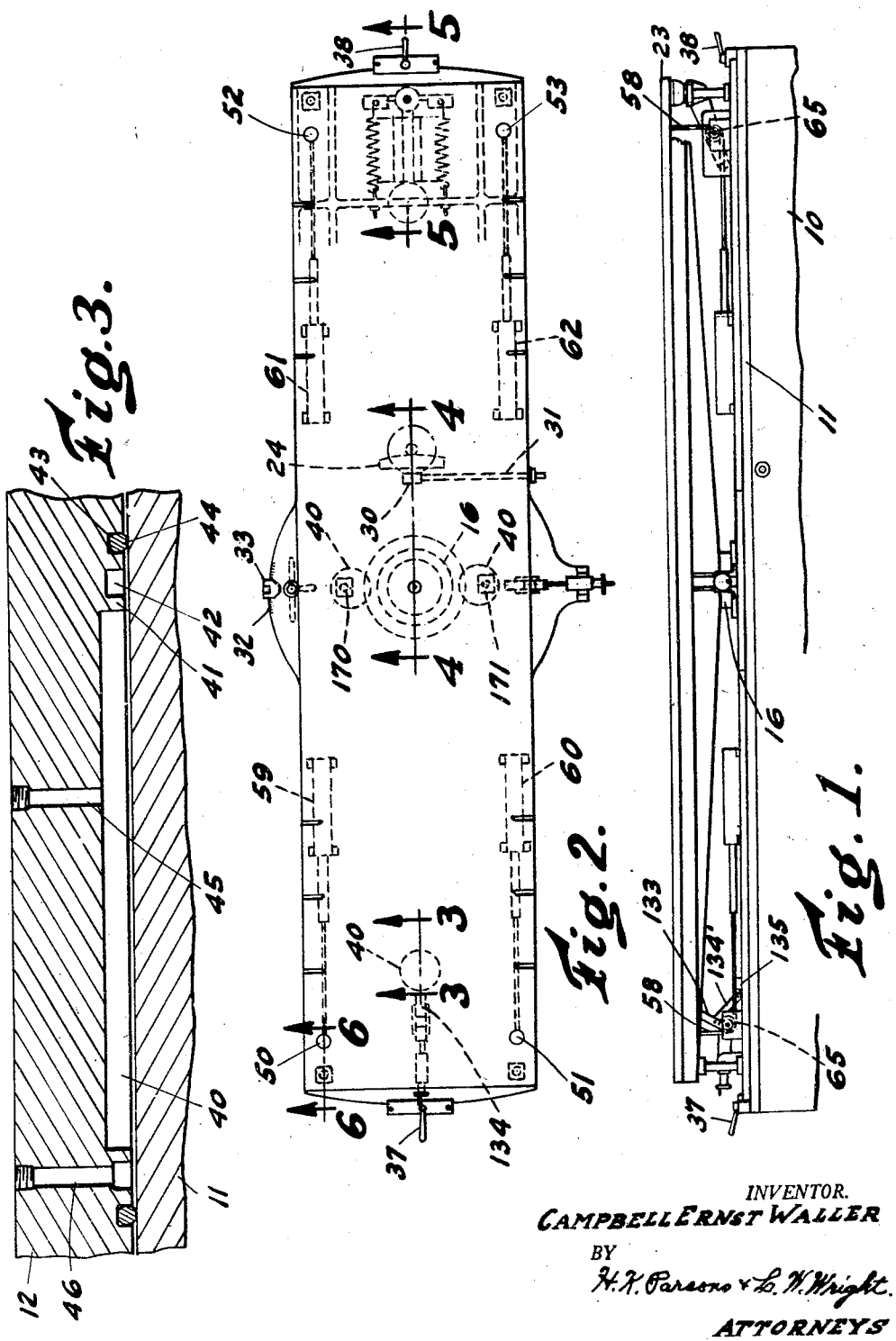

INVENTOR.
CAMPBELL ERNST WALLER
BY
H. K. Parsons & L. W. Wright
ATTORNEYS

Dec. 18, 1956  C. E. WALLER  2,774,642
ADJUSTABLE TABLE FOR MILLING MACHINES
Filed March 21, 1955  4 Sheets-Sheet 3
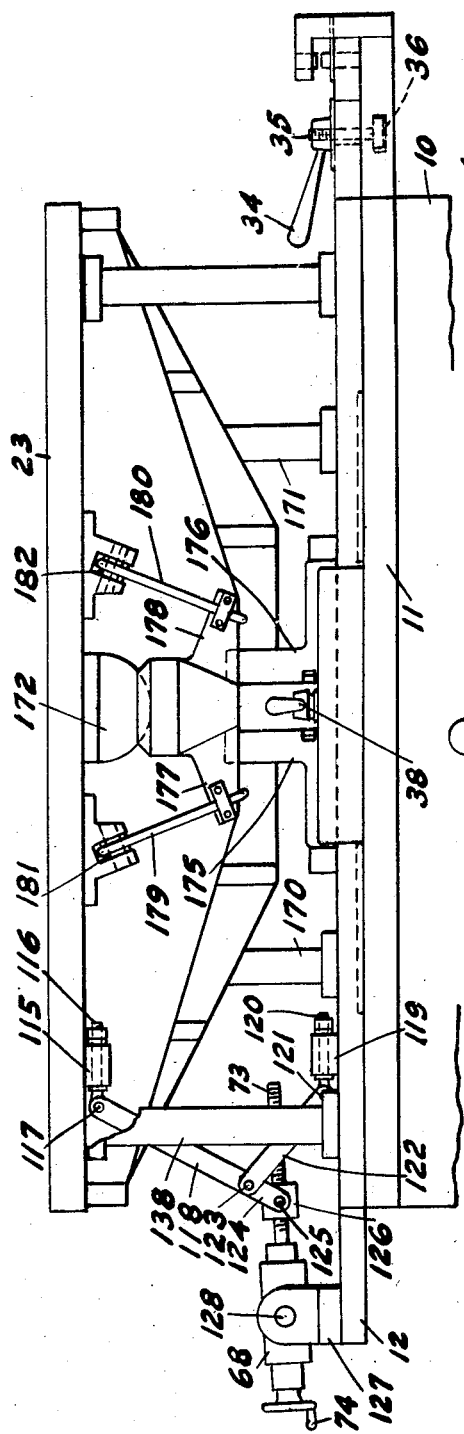
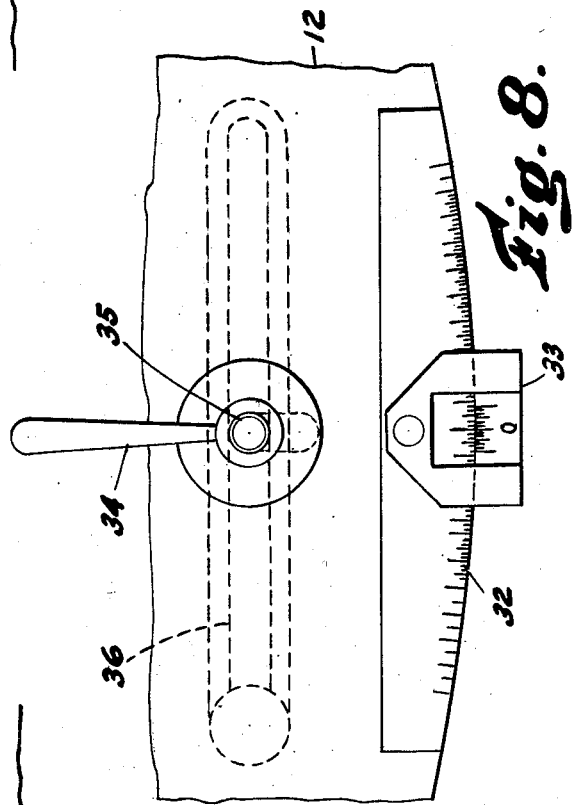
INVENTOR.
CAMPBELL ERNST WALLER
BY
H. K. Parsons & L. W. Wright.
ATTORNEYS

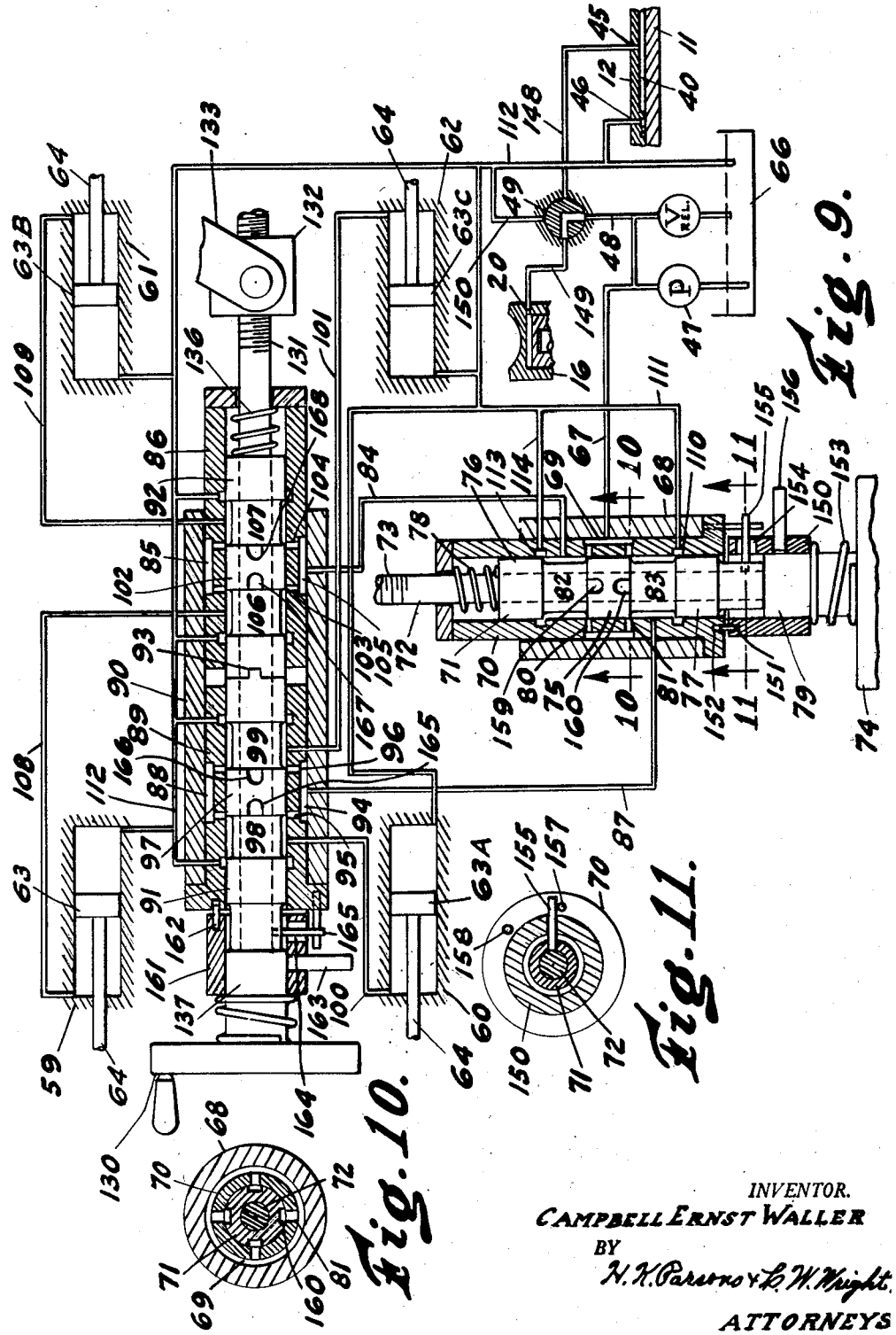

United States Patent Office 2,774,642
Patented Dec. 18, 1956

2,774,642

ADJUSTABLE TABLE FOR MILLING MACHINES

Campbell Ernst Waller, Cincinnati, Ohio, assignor to The Cincinnati Milling Machine Co., Cincinnati, Ohio, a corporation of Ohio Application March 21, 1955, Serial No. 495,460

7 Claims. (Cl. 311—35)

This invention relates to improvements in machine tool tables and has particular reference to a universally adjustable type of table or work support particularly adapted for use during the performance of a milling or like machining operation on large and heavy workpieces, such as airplane spar or wing sections.

One of the objects of the present invention is the provision of an improved structure of universally adjustable table or support particularly adapted for use in connection with large and heavy workpieces in which the table and work as a unit may be readily adjusted into various angular positions.

A further object of the invention is the provision of an improved adjusting mechanism for tilting work-supporting tables which will insure maximum rigidity of support of the work in its adjusted position during a tooling operation.

Another object of the invention is the provision in connection with a universally tiltable machine tool table of improved control and adjusting mechanism alternatively employable for imparting either longitudinal or transverse tilting movements to the table and effective for rigidly securing the table in desired angularly adjusted positions.

An additional object of the invention is the provision in connection with a tiltable machine tool table structure of the character above specified, of improved means for effecting an additional arcuate or angular adjustment of the table and its supporting mechanism as an entirety.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 1 is a fragmentary front elevation of a machine tool structure embodying the features of the present invention.

Figure 2 is a plan view.

Figure 3 is a vertical section on the line 3—3 of Figure 2.

Figure 7 is an end view taken at the right of Figure 1.

Figure 8 is a fragmentary enlarged view of the angle determining gage and clamp for the swivel table or support.

Figure 9 is a semi-diagrammatic view of the hydraulic control circuit for the table tilting movements with the respective servo-valve structures shown in section.

Figure 10 is a transverse section of one of the valves on the line 10—10 of Figure 9, and Figure 11 is a section on the line 11—11 of Figure 9.

Figure 4:
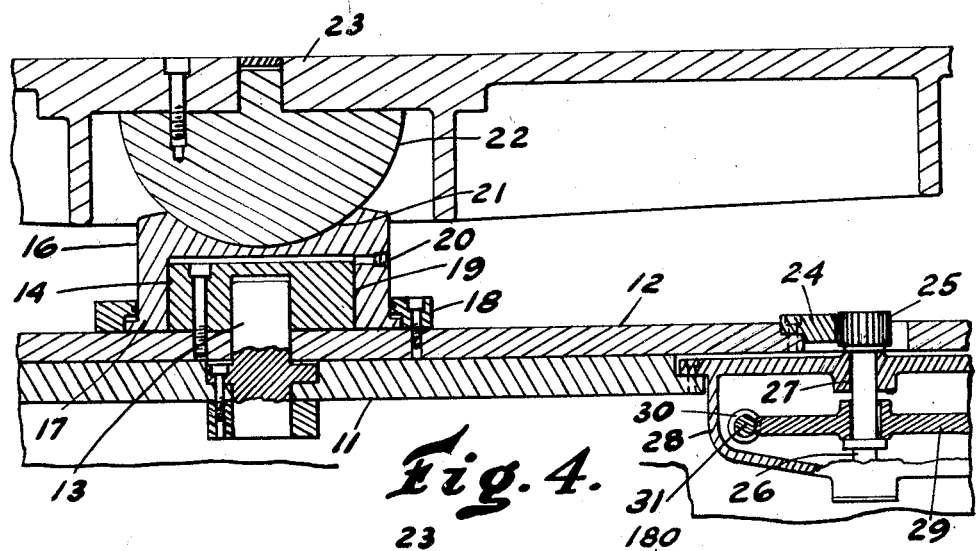
Figure 4 is a central longitudinal sectional view of the swivel table bearing and the associated angular adjusting mechanism taken on the line 4—4 of Figure 2.

In the drawings the improved structure has been shown as mounted on a suitable bed or support 10 for utilization, for example, with conventional fixed bed type milling machines. This bed carries the plate 11 supporting the swivel base 12. Centrally the plate 11 has secured to it the pivot stud 13 providing a vertical axis about which the base 12 rotates. Secured on the base 12 is the pivot block 14 receiving the stud 13 and providing in effect a piston fitting within the lifter block 16 as indicated in Figure 4. The block 16 has a flange portion 17 resting on the base 12 and having limited movement within the positioning ring 18 which is bolted to the base 12 for retaining the lifter block 16 in position. The height of the central recess or bore 19 is of greater depth than the height of the block 14 providing, as shown, a cylinder or chamber area with which communicates port 20. Introduction of pressure medium through the port 20 into the space at 19 will be effective to impart a slight lifting movement to the block 16 and parts supported thereby.

In its upper face the block 16 is provided with the hemispherical recess 21 receiving the ball section 22 secured to the underside of the tilting table 23. The parts 21 and 22 thus provide a ball and socket support located centrally of the table 23 and mounting the table for universal tilting movement with respect to the swivel table 12 and remainder of the machine.

To position and secure the swivel table in desired angularly adjusted relation with respect to the plate 11, the table 23, as indicated in Figures 2 and 4, is provided with an arcuate rack segment 24. This segment meshes with pinion 25 carried by the shaft 26 journaled at 27 in the housing 28 which is secured to the plate 11. On the lower end of the shaft 26 is keyed the worm gear 29 meshing with worm 30 on the adjusting shaft 31 which projects to the front of the bed for suitable actuation. Rotation of the shaft 31 through the worm and gear, pinion and rack will effect desired accurate angular adjustment of base 12 relative to plate 11. To determine the amount of this adjustment the table is provided with graduations at 32 cooperating with a vernier scale on unit 33 which is supported by the plate 11. A clamp handle 34 engaged on the clamp bolt 35 which rides in slot 36 in the plate 11 serves to lock the plate and base together when the desired angular adjustment has been effected. This locking action is supplemented by the clamp handles 37 and 38 reacting on clamping bolts, such as 39 shown in Figure 5 to secure the ends of the base 12 in position.

Due to the size and weight of the table, and the parts, it is contemplated will be supported thereby, the base is preferably provided with recesses as indicated at 40 peripherally bounded by an annular resistance rib 41 circumscribed by a low pressure groove 42 and a second groove 43 containing an O or like sealing ring 44. When it is desired to effect angular adjustment of the table, hydraulic pressure medium is introduced into the spaces 40 by way of conduit 48, valve 49 and conduit 148 to the pressure ports 45, creating a film of fluid under pressure in the space 40 reacting oppositely against the plate 11 and base 12, tending to separate these parts. This tendency will create a slight gap, as shown in Figure 3, between the rib 41 and the member 11 through which the contained pressure at 40 flows between the rib and plate into the low pressure groove 42 for discharge through the outlet port 46. By this construction a supporting oil film is created between the rib 41 and plate 11 facilitating the relative angular adjustment of the parts. This hydraulic actuating medium may be supplied by the general pressure creating pump 47 through the branch conduit 48 controlled by valve 49. This valve may be of the threeway type and is alternatively employable for coupling conduit 149 from port 20, either to conduit 48 as shown in Figure 9 when it is desired to utilize the hydraulic actuating medium for lifting of the tilting table with respect to the base 12, as previously described, or to exhaust conduit 150—112.

Figure 6:
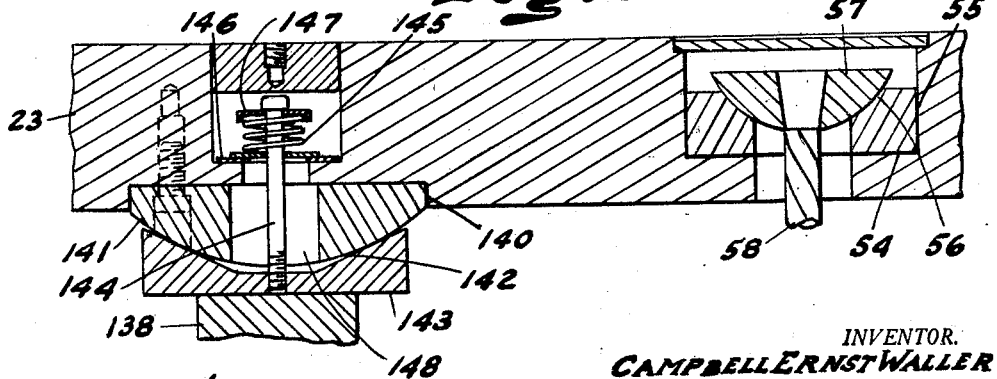
Figure 6 is a fragmentary sectional view of the cable actuating and gage block contactor members taken on the line 6—6 of Figure 2.

For effecting power tilting adjustment of the table with respect to its base, as indicated in Figure 2 and structurally shown in detail in Figure 6, the table is provided near its four corners as at 50, 51, 52 and 53 with sockets such as shown at 54 to receive blocks 55 having the spherical or rounded seats 56 for the ball sections 57 to each of which is secured a flexible connection or cable 58.

Secured on the base 12 are the four hydraulic motors, including the cylinders 59, 60, 61, and 62, containing the pistons 63, 63A, 63B and 63C each having a piston rod 64 connected by a cable 58 extending around a pulley 65 to the adjacent corner of the table. By reference to Figures 2 and 9, it will be seen that there is a cylinder structure and appropriate cable connections individual to each of the four corners of the table.

The purpose and control of these cylinders will be best understood by reference to Figure 9 from which it will be seen that the pump 47 draws hydraulic actuating medium from the tank 66 and discharges it into the main pressure conduit 67 which is ported through the valve housing 68 into the exterior groove 69 of the primary valve bushing 70 which is suitably secured within the housing.

Slidable within this bushing is the tubular valve 71 through which passes the adjusting screw 72 of the servomechanism having a threaded portion 73 at one end and having secured to its opposite end the operating hand wheel 74. The valve 71 has a central spool portion 75 and the terminal spool portions 76 and 77, the valve as an entirety being outwardly urged or, as viewed in Figure 9, is downwardly urged with respect to the bushing by a spring 78, and at its outer end is seated against the hub or collar portion 79 of the hand wheel 74.

Extending inwardly from the pressure groove 69 are a plurality of pairs of radial ports 80 and 81, the width of the spool 75 being such that when the valve 71 is in its intermediate or neutral position the edges of the spool will be in a slight hydraulically underlapped relation to the walls of the ports 80 and 81. As a result there will be balanced or equal flows from the ports 80 and 81 into the grooves 82 and 83 of valve 71, which grooves intervene the central spool 75 and the outer spool portions 76 and 77 of the valve. The parts being thus centralized, flow from the groove 82 will be by way of conduit 84 to distribution groove 85 in valve bushing 86, while flow from groove 83 will be by way of conduit 87 to distribution groove 88 of the valve bushing 89.

These valve bushings are secured within the housing 90, being preferably separately formed for relative longitudinal adjustment to insure accurate relative positioning of their respective portings with respect to the control spools of the contained sliding tubular valves 91 and 92 which are connected for joint rotation as by the tongue and groove interlock indicated at 93 in Figure 9.

The conduit 87 is ported into the exterior distribution groove 94 of the valve unit 91. The ports 95 and 96 extend from this groove to the interior of the bushing adjacent the ends of the central spool 97 of the valve 91, the relative size and position of the spool and portings being such that there is normally a balanced flow from 95 into the groove 98 and from 96 into the groove 99 of the valve member. Ported into the bushing in a position to communicate with groove 98 is the conduit 100 extending to the outer end of the cylinder 60 reacting against the piston rod side of piston 63A. Pressure conveyed by conduit 100 will tend to move the piston 63A toward the right, thus tensioning the piston rod 64 to cause it to exert through the cable 58 downward pull against the left front corner of the tilting table 23. Correspondingly, pressure flowing into groove 99 is coupled through conduit 101 ported into the bushing opposite this groove to the outer or right hand end of cylinder 62 reacting against the piston 63C to move it inwardly or toward the left to exert through the rod and cable connection 64—58 a downward pull against the right front corner of the tilting table as viewed in Figure 2.

Similar conditions exist as respects the valve member 92. This valve is provided with the central spool portion 102 which in its central position occupies a hydraulically underlapped relation to the ports 103 and 104 which extend from the exterior groove 105 of the bushing to the interior of the bushing. Therefore, with the spool 102 in its centralized position, depending on whether pressure conduit or exhaust conduit is coupled with the conduit 84 there will be either an in or an out flow through the ports 103 to the groove area 106 of the valve 92 and correspondingly through the ports 104 to the groove area 107 of this valve. Permanently associated with the groove 106 is a conduit 108 extending to the outer end of cylinder 59 while a conduit 109 in all positions of the valve couples the groove 107 to the outer end of the cylinder 61. Consequently, when the spool 102 is in a centralized position equal pressure conditions in the cylinders 59 and 61 will react equally as respects the contained pistons. As the pistons of the cylinders 59 and 61 are coupled by cables 58 with the sockets 50 and 52 of the tilting table 23 equal pressures in these cylinders will tend to tilt the rear side of the table downwardly toward the supporting base 12.

By reference to Figure 9 it will be apparent that if the valve 71 be moved inwardly in the machine, or in a direction toward the top of the sheet as viewed in Figure 9 the resistance to flow from the pressure conduit 67 by way of porting 81 will be reduced so that there will be a pressure rise in 87 due in part to the opening of the throttling effect at the ports 81 and in part due to the restriction of the flow past the edge of the spool 77 into the exhaust groove 110 coupled by the conduit 111 with the general exhaust or reservoir return low pressure conduit system 112. This increase of pressure will be effective through groove 94, ports 95 and 96 and conduits 100 and 101 to move the pistons 63A and 63C inwardly, exerting a downward tilting force against the two front corners of the table. At the same time this movement of the valve spool 75 will shut off the flow through the ports 80 and will reduce the restriction to flow from groove 82 into the exhaust groove 113 connected by the branch conduit 114 with the low pressure conduit system 112. This will cause a pressure drop in the conduit 84 and consequently in the connected conduits 108 and 109 and cylinders 59 and 61. With this setting, the front cylinders 61 and 62 and their pistons will be controlling and the table will be forwardly tilted under power at a rate determined by the pressure input throttling effected by the edge of the valve spool 77 and the exhaust flow throttling effected by the edge of the spool 76. The movement will therefore continue until the valve 71 is suitably moved to a centralized position, which may be effected either manually or by suitable feed back mechanism of the type illustrated in Figure 7.

As there shown, the tilting table 23 is provided on its underside with the bracket or lug 115 rotatably supporting the swivel pin 116 having its outer end pivoted at 117 to the link or lever 118. A second lug 119 on the base 12 rotatably mounts the pin 120 pivoted at 121 to a second lever or link 122. The links or levers 118 and 122 are pivoted together at 123 to provide a toggle mechanism whose angle will be increased or decreased in accordance with transverse tilting movements of the table 23.

The lower end of the link or lever 118 is preferably formed with a yoke or clevice at 124 in which is pivoted as at 125 the nut 126 through which the valve adjusting screw 73 is threaded. Rotation of the handle 74 in one direction will cause an inward movement of the screw which will be transmitted by the collar 79 to the outer end of the valve 71 while rotation of the handle in the opposite direction will cause the screw and collar 79 to move outwardly, being followed up by valve 71 due to expansion of spring 78.

To permit of free movement of the parts, the base 12 is provided with the bracket 127 pivotally mounting the trunnion or trunnions 128 of the valve housing 68.

As has been described, inward movement of the valve 71 will cause an increase in pressure conditions in the cylinders 60 and 62, tilting the table forwardly, or downwardly at the right hand side, as viewed in Figure 7. Such movement will react through the toggle linkage 118—122 to move nut 126 and thus screw 73 toward the right as viewed in Figure 7 or downwardly as viewed in Figure 9 to restore the valve spool 75 to its intermediate neutral position.

There has thus been provided an automatic servo-feedback in which the extent of movement of the valve spool 75 in one direction or another from neutral by rotation of the screw 73 is being continuously counteracted by the opposite directional movement of the nut 126. In this manner an extremely fine control of definite amount of power tilting of the table 23 is effected. At the same time, due to the fact that the swivel pins 116 and 120 are disposed in the same vertical plane as the axis of longitudinal tilting of the table, the adjusitng and feedback mechanism will not be effected by such longitudinal tilting.

Control of power longitudinal tilting of the table is effected by rotation of the hand wheel 130 on the outer end of the valve adjusting screw shaft 131 which extends through the sleeve valves 91 and 92 and has its inner end engaged in a nut 132 carried by the toggle link 133 having its upper end pivoted at 134 to the underside of the table in the manner indicated in connection with link 118 in Figure 7. Pivoted to the link 133 is a second link 134' corresponding to the link 122 of Figure 7 and suitably, similarly pivoted to the base 12 at 135. As will be apparent by reference to Figure 2, these parts lie in a plane extending through the axis of transverse tilt of the table so as to be unaffected by transverse tilting movements but directly effected to expand or contract the toggle and correspondingly effected feedback of the nut 132 for repositioning or centralization of the valve elements 91, 92 which in use are adjusted as an entirety.

This valve structure is urged toward the left in its housing as viewed in Figure 9 by the interposed spring 136 and to the right as viewed in said figure by screw effected movement of the collar 137 to the right when the screw 131 is rotated. Right hand longitudinal sliding movement of the valve elements 91—92 will be effective to increase the pressure conditions in the left hand ends of cylinders 59 and 60 causing a downward movement of the left hand end of the table as viewed in Figure 1 while relieving pressure conditions in the right hand ends of cylinders 61 and 62, permitting the corresponding cable effected outward movement of the contained pistons of said cylinders, and thus the corresponding upward movement of the right hand end of the table.

As before, the action of the toggle mechanism 133—134' is effective as a feedback continuously reacting to move the valve elements 91—92 into neutral position so that the amount of tilt is directly responsive to and controlled by the extent of rotation of the hand wheel 130 and screw 131.

It will be evident that opposite or left hand movement of the valves 91—92 will cause pressure increases in the cylinder 61, 62 and pressure relief or decreased reaction in the cylinders 59 and 60 to effect opposite longitudinal tilting of the table.

When it is desired to effect most rigid locking of the table in any particular position of adjustment, use may be made of the gage blocks, such as 138, 139 shown in Figure 7 of exact correct height for interposition between the base 12 and the tiltedly adjusted table corners. To facilitate employment of these gage blocks there are preferably provided at suitable locating spots on the underside of the table 23 the sockets 140 into which are secured the rounded or hemispherical bearing elements 141 fitting into the sockets 142 in blocks 143. These blocks are retained in position by bolts 144 urged upwardly by springs 145 bearing at one side against the pressure plates 146 and at the other against the collars 147 carried by the bolts or studs 144. The hemispherical members 141 have enlarged central bores or apertures at 148, permitting free angular adjustment of the bolts 144 and consequent angular adjustment of the support blocks 143 about the spherical guide surface of the members 141. In this manner, irrespective of the angle of tilt of the table, the undersurface of the blocks 143 may bear directly upon and fit against the square ends of the spacers or gage blocks 138. By employment of the parts thus described, a solid and rigid metal to metal contact support may be provided between the base 12 and the underside of the tiltable table 23. Preferably, the gage supports 138 are placed in position between the tilting table and base to limit the downward movement of the corner or corners of the table which are being moved toward the base during the tilting action, thus to establish the degree of tilt imparted.

Subsequent to this, additional corresponding gage members may be inserted between the bed and the corner or other support blocks 143 at the high side of the table.

These gage or spacing members having been positioned, in view of the weight of parts involved and cutting forces exerted during milling operations, it is desirable that the unit as an entirety be firmly clamped together.

The structural features for accomplishment of this are shown in detail in Figures 9, 10, and 11. Rotatably mounted on the hub of each wheel, such as the hub 79 of the handwheel 74, is a sleeve 150 provided with a detent pin 151 engageable in a retaining socket, such as 152 formed in the end of the valve bushing 70. The spring 153 interposed between the hand wheel 74 and the outer end of the sleeve 150 urges the sleeve 150 toward the bushing 70 to hold the pin in locking engagement and also urging the hand wheel and connected screw in an outward direction. The sleeve 150 is provided with an axially extending slot 154 receiving pin 155 carried by the valve 71. This slot permits of longitudinal movement of the valve relative to the sleeve for valve adjusting purposes when the sleeve is stationary and alternatively permits of longitudinal sliding of the sleeve 150 on the hub or collar 79 without longitudinal movement of the valve. Such longitudinal movement is facilitated by the pin or handle 156 which projects radially from the sleeve and may be grasped to move the sleeve outwardly against the pressure of spring 153 to disengage detent 151 from the socket 152. When so disengaged, the sleeve may be rotated on the hub and will react through pin 155 to effect a corresponding rotation of the valve. The amount of such rotary movement is limited by the stop pins 157 and 158 carried by the bushing 70.

As has been previously described, pin 151 then holds sleeve 150 in its adjusted position by being engaged in another detent hole. The valve bushing is provided with a plurality of radially extending ports, such as 80 and 81 with which the edges of the valve spool 75 cooperate variably to determine the amount of throttling of pressure fluid through the ports.

For locking purposes, however, the spool 75 is provided with notches such as 159 and 160 which interrupt the edge and adjacent portion of the body of the spool, providing in effect passages or ports for unrestricted flow of the hydraulic pressure medium. In Figure 10 the ports 160 have been shown as aligned with ports 81. In this position flow from port 81 will discharge through the port or groove 160 and groove 83 into conduit 87. A similar condition existing at the opposite end of valve spool 75 provides for free flow from port 80 through 159 and groove 82 to conduit 84. Therefore, when the valve spool is positioned as shown in Figure 10, there is no restricting throttling effect exerted by the edges of the spool and the full pressure flow is coupled from conduit 67 by way of groove 69 and the notches or portings 159 and 160 to the respective conduits 84 and 87 is available in the grooves 94 and 105 of bushing 86.

Correspondingly, the hub 137 supports the sleeve 161 having locking detent 162, operating pin or handle 163 and slot 164 to receive pin 165 on the valve 91 for effecting rotation of this valve. In this structure, the valve spool 97 controlling the flow distribution to cylinders 60 and 62 is provided with the distribution notches 165 and 166 rotatable into alignment with the ports 95 and 96. Likewise, the valve spool 102 is provided with the notches or ports 167 and 168 alignable by rotation of valve 92 with ports 103 and 104 to permit free flow into the valve grooves 106 and 107 and thence to the cylinders 59 and 61.

From the foregoing it will be seen that an extremely simple but efficient interlock mechanism has been provided for utilization when the machine has been tilted to desired position as determined and blocked by the gage or support units 138 by which full pressure will be introduced equally into the outer ends of the four tilting table corner control cylinders 59, 60, 61, and 62. This reaction through tensioning of cables 58 will pull the table as an entirety solidly down and lock it in position against the members 138 to the extent necessary to resist any displacing strain during the machining operation.

If desired, centralized bracing gage blocks such as 170 and 171 indicated in dotted lines in Figure 2 may be employed for additionally bracing the table, the introduced pressure in the space 19 exerting sufficient lifting force against the table supporting sphere 22 to facilitate introduction of the various central brace blocks.

Figure 5:
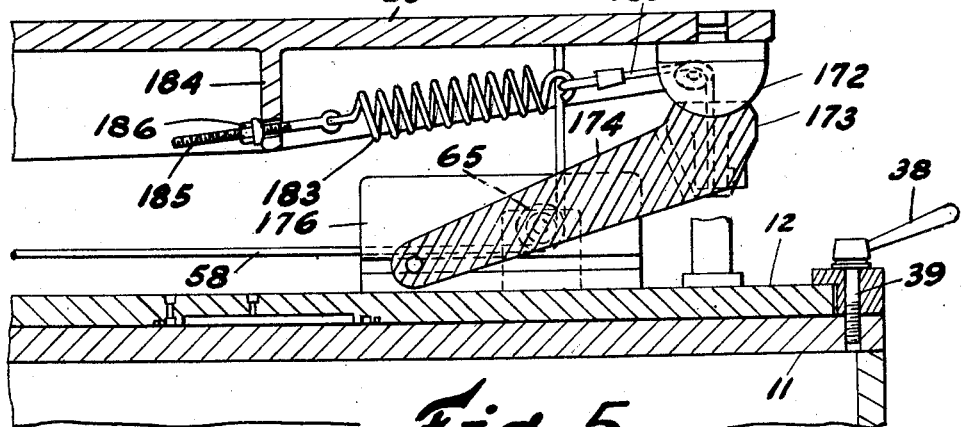
Figure 5 is a fragmentary sectional view of the machanism connecting the angularly adjustable support and the table taken on line 5—5 of Figure 2.

To supplement the stabilizing action of the corner attached table clamping cables 58, and prevent any possible relative angular twisting movement of the tilting table 23 with respect to the base 12 during angular or other adjustment of the parts, use is made of a resilient interlock mechanism particularly illustrated in Figures 5 and 7.

Secured to the underside of the tilting table 23 at the right hand end is the ball section 172 fitting in the socket 173 carried by an arm 174 pivotally mounted on base 12 by brackets 175 and 176 which engage the sides of the member 174 to maintain its longitudinal alignment with the base while permitting swinging movement in a vertical plane.

This arm is provided with the lateral extensions 177 and 178 to which are secured the cables 179 and 180 extending over the idler pulleys 181 and 182 rotatably mounted on the underside of the table. Heavy coil springs, such as 183, are secured to the ends of the respective cables 179 and 180 to provide a tension on the cables holding the ball and socket parts 172 and 173 in tight interfitting engagement one with the other. A depending rib 184 on the table 23 receives the adjusting bolts 185 secured to the opposite ends of springs 183 from the cable engaging ends, nuts 186 serving variably to tension the springs and parts.

From the foregoing it will be noted that the tilting table is supported by ball and socket connection upon the base 12 for universal tilting or angular adjustments with respect to a horizontal plane. As particularly indicated in Figure 2, the auxiliary yieldingly held ball and socket mechanism 172, 173 is disposed on the longitudinal axis of the table passing through the center of tilt established by the ball and socket connection 21, 22. During forward and backward tilting the two ball supports 22 and 172 will roll in their respective sockets without disturbing the position of the arm 174 which through its connection to the base and the table prevents any rotary or angular relative movement in a horizontal plane of the base and table. On the other hand, when the table is tilted longitudinally about the ball and socket support 21—22, the arm 174 will swing up and down with the ball and socket 172—173 maintained in tight interlocking engagement by the reaction of the springs 183 on the cables 179—180 so that the structure in question is equally effective for preventing relative horizontal angular displacement of the base and table in connection with such longitudinal tilting.

It will further be evident from the foregoing description that in the several power adjustments of the tilting table, the cylinders act in pairs whether effecting a transverse or a longitudinal tilting of the table. When a transverse tilting is to be effected, the cylinders 60 and 62 act as a power pair effective to move downwardly the front edge of the table when the valve 71 is moved inwardly relative to the machine, causing a predominance of pressure in the conduit 87, while the conduit 84 through the conduit system connections completed by valve 92 forms a relief or low pressure connection for the other pair of cylinders 59 and 61. An opposite reaction is effected by reverse shifting of the valve 71 when the cylinders 59—61 become the pressure cylinders reacting against the rear corners of the table and pressure is relieved in the forward cylinders 60 and 62. In the primary adjustment the cylinders 60, 62, form a first pair, and the cylinders 59, 61 a second pair, one pair or the other being energized to effect the forward and back or transverse tilting of the table 23 in accordance with movements imparted to the valve 71. During such operation, the controller or handle 74 operating or rotating the screw 73 with respect to the nut 126 determines manual displacement of the valve member, while the feedback mechanism including the linkage 118—122 actuable by movement of the table effects a bodily compensating shifting of the feed nut 126 reacting to move the valve member 71 toward its normal neutral position and stabilizing the parts in any adjusted position to which movement has been initiated by operation of the control handle 74.

For determination of longitudinal tilting or angular adjustment with respect to a horizontal plane as respects the table 23, there has been provided the valve unit 91—92 in series with the valve 71 through which the jointly or individually effective pressure circuits established in 84 and 87 flow. When it is desired to effect longitudinal tilting, this is accomplished by imparting a longitudinal or axial movement jointly to the members 91—92, which together have throttle portions individual to the respective cylinders 59, 60, 61, and 62. The reaction established by this second valve mechanism is distinct, however, from that effected by movement of the valve 71. For example, movement of this control valve 91—92 to the right as viewed in Figure 9 reduces the throttling of inlet port 95 and increases the throttling of flow into 112 to increase the pressure in the cylinder 60. At the same time, movement of spool 120 opens, decreases throttling for port 103 by the edge of the spool 102 and increases the pressure effective in the cylinder 59 of what was previously termed "the other pair of cylinders," namely 59—61 when referring to the action of valve 71. This movement of valves 91—92 correspondingly throttles the pressure flow into grooves 99 and 107 and reduces the throttling resistance to flow from these grooves to low pressure conduit 112, causing a pressure drop in conduits 101 and 109 of cylinder 63B and 63C. Reverse movement of valve 91—92 makes cylinders 63B and 63C the controlling pair of power cylinders.

It will thus be seen that the valve structure 91—92 is so connected with the several cylinders that its longitudinal movement in one direction will effect an introduction of pressure into one cylinder of the front and the corresponding cylinder of the rear pair while simultaneously effecting relief of pressure from the opposite cylinders of the front pair and the rear pair. Movement in the opposite direction will, of course, reverse the pressure and pressure relief conditions as respects these paired cylinders. By this structure and manner of hydraulic coupling, the four cylinders are jointly controlled in pairs whether the effect is transverse tilting or a longitudinal tilting but a different pair arrangement is used for the respective adjustments. Furthermore, by rotation of the respective valve elements 71 and 91—92, the throttling effect of the edges of the several spool portions of the valves is bypassed. Direct conduit connections, unaffected by axial movement of the control valves, are established by way of the various grooves or notches, such as 159 and 160, 165—166, and 167—168, so that all four cylinders are subjected to equal high pressure to lock the table in position during machining operations.

What is claimed is:

1. A tilting table structure for a milling machine or the like including a base and a table supported in spaced relation thereto, supporting means intervening the base and table including a ball and socket swivel, a power means carried by the base and engaging the table at a plurality of points in spaced relation to said ball and socket swivel for effecting tilting of the table about two axes intersecting at said swivel and lying in a plane parallel to said base, and means attached to said table along one of said axes and spaced from said swivel for preventing rotary movement of said table about an axis passing through said swivel perpendicular to said plane, said means including a second ball and socket joint having interfitting parts, one of which is secured to the table and the other guided on said base for confined movement along said one of said axes.

2. A tilting table structure for a milling machine or the like including a base and a table supported in spaced relation thereto, supporting means intervening the base and table including a ball and socket swivel, a power means carried by the base and engaging the table at a plurality of points in spaced relation to said ball and socket swivel for effecting tilting of the table about two axes intersecting at said swivel and lying in a plane parallel to said base, means attached to said table along one of said axes and spaced from said swivel for preventing rotary movement of said table about an axis passing through said swivel perpendicular to said plane, said means including a second ball and socket joint having interfitting parts, one of which is secured to the table and the other guided on said base for confined movement along said one of said axes, and means carried by the table for maintaining the ball and socket of said second joint in closed interfitting engagement one with the other.

3. A tilting table structure for a milling machine or the like including a base and a table supported in spaced relation thereto, supporting means intervening the base and the center of said table including a ball and socket swivel, power means carried by the base and engaging the table at a plurality of points in spaced relation to said central ball and socket swivel for effecting tilting of the table with respect to the base about two axes intersecting at said swivel and lying in a plane parallel to said base, and means attached to said table along one of said axes and spaced from said swivel for preventing rotary movement of said table about an axis perpendicular to said plane, said means including a second ball and socket joint having interfitting parts, one of which is secured to the table and the other comprising a lever having one end guided on said base for confined movement along said one of said axes, and means for maintaining the ball and socket of said second joint in close interfitting engagement one with the other including resilient means carried by the table and reacting on said lever.

4. A tilting table structure for a milling machine or the like including a base and a table supported in spaced relation thereto, supporting means intervening the base and the center of the table including a ball and socket swivel, a power means carried by the base and operatively connected to the four corners of said table for effecting tilting thereof about two axes intersecting at said swivel and lying in a plane parallel to said base, said power means including a first pair of hydraulic motors disposed at one side of the swivel, a second pair of hydraulic motors disposed at the opposite side of the swivel, operative power transmitting connections individually coupling each of said motors with a corner of said table, a source of pressure, conduit means operatively associated with the motors and a valve means having a first position to effect a reduced pressure connection from said source to the conduit means for both pairs of motors, said valve means including a member shiftable into alternative positions to increase the pressure connection to the conduits of one or the other of said pairs of motors and simultaneously decreasing the pressure connection for the conduits of the other pair of motors.

5. A tilting table structure for a milling machine or the like including a base and a table supported in spaced relation thereto, supporting means intervening the base and the center of the table including a ball and socket swivel, a power means carried by the base and operatively connected to the four corners of said table for effecting tilting thereof about two axes intersecting at said swivel and lying in a plane parallel to said base, said power means including a first pair of hydraulic motors disposed at one side of the swivel, a second pair of hydraulic motors disposed at the opposite side of the swivel, operative power transmitting connections individually coupling each of said motors with a corner of said table, a source of pressure, conduit means operatively associated with the motors and a valve means having a first position to effect a reduced pressure connection from said source to the conduit means for both pairs of motors, said valve means including a member shiftable into alternative positions to increase the pressure connection to the conduits of one or the other of said pairs of motors and simultaneously decreasing the pressure connection for the conduits of the other pair of motors, said conduit means including a second shiftable valve means serially intervening the first valve means and the motors, said second valve means having individual throttle portions for controlling the pressure connection from the first valve means to each of said motors, said throttle portions being so related that movement in one direction will increase the pressure connection to the one of the motors of each pair to actuate said motors while movement in the opposite direction will decrease the pressure connection to the other of each pair substantially as and for the purpose described.

6. A tilting table structure for a milling machine or the like including a base and a table supported in spaced relation thereto, supporting means intervening the base and the center of the table including a ball and socket swivel, a power means carried by the base and operatively connected to the four corners of said table for effecting tilting thereof about two axes intersecting at said swivel and lying in a plane parallel to said base, said power means including a first pair of hydraulic motors disposed at one side of the swivel, a second pair of hydraulic motors disposed at the opposite side of the swivel, operative power transmitting connections individually coupling each of said motors with a corner of said table, a source of pressure, conduit means operatively associated with the motors and a valve means having a first position to effect a reduced pressure connection from said source to the conduit means for both pairs of motors, said valve means including a member shiftable into alternative positions to increase the pressure connection to the conduits of one or the other of said pairs of motors and simultaneously decreasing the pressure connection for the conduits of the other pair of motors, whereby the pressure coupled motors will react jointly to effect tilting of the table, a first controller operable for moving said member in a selected direction to initiate tilting of the table and a feed back operable by tilting of the table reacting on said member to move it in an opposite direction to stop the tilting movement.

7. A tilting table structure for a milling machine or the like including a base and a table supported in spaced relation thereto, supporting means intervening the base and the center of the table including a ball and socket swivel, a power means carried by the base and operatively connected to the four corners of said table for effecting tilting thereof about two axes intersecting at said swivel and lying in a plane parallel to said base, said power means including a first pair of hydraulic motors disposed at one side of the swivel, a second pair of hydraulic motors disposed at the opposite side of the swivel, operative power transmitting connections individually coupling each of said motors with a corner of said table, a source of pressure, conduit means operatively associated with the motors and a valve means having a first position to effect a reduced pressure connection from said source to the conduit means for both pairs of motors, said valve means including a member shiftable into alternative positions to increase the pressure connection to the conduits of one or the other of said pairs of motors and simultaneously decreasing the pressure connection for the conduits of the other pair of motors, whereby the pressure coupled motors will react jointly to effect tilting of the table, a first controller operable for moving said member in a selected direction to initiate tilting of the table and a feed back operable by tilting of the table reacting on said member to move it in an opposite direction to stop the tilting movement, said feedback including a feed screw rotatable by the controller and a feed nut forming a part of the feed back engaging said screw and operatively connected to the tiltable table.

References Cited in the file of this patent

UNITED STATES PATENTS

| | | |
|---|---|---|
| 804,784 | Eschen | Nov. 14, 1905 |
| 926,579 | Laughlin | June 29, 1909 |
| 1,166,018 | Seresi | Dec. 28, 1915 |
| 2,172,941 | Manning et al. | Sept. 12, 1939 |
| 2,217,783 | Bell | Oct. 15, 1940 |
| 2,321,486 | Holt | June 8, 1943 |
| 2,459,800 | Esgate | Jan. 25, 1949 |
| 2,520,455 | Clachko | Aug. 29, 1950 |
| 2,662,708 | Schmitt | Dec. 15, 1953 |
| 2,686,095 | Carlson | Aug. 10, 1954 |
| 2,730,415 | Kane | Jan. 10, 1956 |